US006829632B1

(12) United States Patent
Chessell et al.

(10) Patent No.: US 6,829,632 B1
(45) Date of Patent: Dec. 7, 2004

(54) APPARATUS, METHOD AND COMPUTER PROGRAM PRODUCT FOR CLIENT/SERVER COMPUTING WITH TIMING OF CREATION OF COORDINATOR TRANSACTION STATE OBJECT BEING BASED ON TRIGGERING EVENTS

(75) Inventors: Amanda Elizabeth Chessell, Alton (GB); Martin Mulholland, Winchester (GB); Kathryn Sarah Warr, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 841 days.

(21) Appl. No.: 09/094,314

(22) Filed: Jun. 9, 1998

(30) Foreign Application Priority Data

Mar. 18, 1998 (GB) .............................................. 9805781

(51) Int. Cl.[7] .............................................. B06F 15/16
(52) U.S. Cl. ...................... 709/203; 709/243; 709/317; 709/331; 709/332
(58) Field of Search ................................ 709/201, 203, 709/243, 300, 301, 302, 303, 304, 305, 202, 317, 331, 332

(56) References Cited

U.S. PATENT DOCUMENTS

| | | | |
|---|---|---|---|
| 5,471,399 A | * | 11/1995 | Tanaka et al. |
| 5,550,971 A | * | 8/1996 | Brunner et al. |
| 5,560,005 A | * | 9/1996 | Hoover et al. |
| 5,581,765 A | * | 12/1996 | Munroe et al. |
| 5,586,255 A | * | 12/1996 | Tanaka et al. .............. 709/201 |
| 5,600,775 A | * | 2/1997 | King et al. |
| 5,696,697 A | * | 12/1997 | Blau et al. |
| 5,727,203 A | * | 3/1998 | Hapner et al. .............. 395/614 |
| 5,751,914 A | * | 5/1998 | Coley et al. .................. 395/51 |
| 5,857,100 A | * | 1/1999 | Phillips et al. .............. 395/671 |
| 5,857,102 A | * | 1/1999 | McChesney et al. |
| 5,864,843 A | * | 1/1999 | Carino, Jr. et al. |
| 5,864,866 A | * | 1/1999 | Henckel et al. |
| 5,872,969 A | * | 2/1999 | Copeland et al. ........... 395/671 |
| 5,878,428 A | * | 3/1999 | Copeland et al. |
| 5,884,327 A | * | 3/1999 | Cotner et al. |
| 5,907,696 A | * | 5/1999 | Stilwell et al. |
| 5,907,847 A | * | 5/1999 | Goldberg |
| 5,923,833 A | * | 7/1999 | Freund et al. |
| 5,925,095 A | * | 7/1999 | High, Jr. et al. |
| 5,940,827 A | * | 8/1999 | Hapner et al. .................. 707/8 |
| 5,941,945 A | * | 8/1999 | Aditham et al. |
| 5,941,978 A | * | 8/1999 | Finni |
| 5,949,998 A | * | 9/1999 | Fowlow et al. |
| 5,956,506 A | * | 9/1999 | Cobb et al. |
| 5,995,753 A | * | 11/1999 | Walker |
| 6,009,264 A | * | 12/1999 | Merritt et al. |
| 6,016,495 A | * | 1/2000 | McKeehan et al. |
| 6,029,177 A | * | 2/2000 | Sadiq et al. |

FOREIGN PATENT DOCUMENTS

| EP | 0707265 | 4/1996 | .............. G06F/9/46 |
|---|---|---|---|
| EP | 0834807 | 4/1998 | .............. G06F/9/46 |

* cited by examiner

Primary Examiner—Rupal Dharia
Assistant Examiner—Stephan Willett
(74) Attorney, Agent, or Firm—Gregory M. Doudnikoff

(57) ABSTRACT

A server processing method for use in a client/server computing system which carries out transactions, has steps of: receiving a command instructing the server to carry out a step of a transaction; beginning the transaction; and determining whether a predetermined triggering event has occurred during the carrying out of the transaction, and only if the triggering event has occurred, creating a means for coordinating the transaction with respect to a plurality of elements that are involved in carrying out the transaction.

21 Claims, 3 Drawing Sheets

APPARATUS, METHOD AND COMPUTER PROGRAM PRODUCT FOR CLIENT/ SERVER COMPUTING WITH TIMING OF CREATION OF COORDINATOR TRANSACTION STATE OBJECT BEING BASED ON TRIGGERING EVENTS

FIELD OF THE INVENTION

The invention relates to the field of client/server (also known as "distributed") computing, where one computing device ("the client") requests another computing device ("the server") to perform part of the client's work. The client and server can also be both located on the same physical computing device.

BACKGROUND OF THE INVENTION

Client/server computing has become more and more important over the past few years in the information technology world. This type of distributed computing allows one machine to delegate some of its work to another machine that might be, for example, better suited to perform that work. For example, the server could be a high-powered computer running a database program managing the storage of a vast amount of data, while the client is simply a desktop personal computer (PC) which requests information from the database to use in one of its local programs.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Published Application No. EP 0 677,943 A2. These latter two publications are hereby incorporated by reference. However, an example of the basic architecture will be given below for contextual understanding of the invention's environment.

As shown in FIG. 1, the client computer 10 (which could, for example, be a personal computer having the IBM OS/2 operating system installed thereon) has an application program 40 running on its operating system ("IBM" and "OS/2" are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object at the server, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms with distributed objects as is shown in FIG. 1. The OMG has set forth published standards by which client computers (e.g. 10) communicate (in OOP form) with server machines (e.g. 20). As part of these standards, an Object Request Broker (called CORBA—the Common Object Request Broker Architecture) has been defined, which provides the object-oriented bridge between the client and the server machines. The ORB decouples the client and server applications from the object oriented implementation details, performing at least part of the work of the first and second logic means 50 and 90 as well as the connection means 80.

As part of the CORBA software structure, the OMG has set forth standards related to "transactions" and these standards are known as the OTS or Object Transaction Service. See, e.g., CORBA Object Transaction Service Specification 1.0, OMG Document 94.8.4. Computer implemented transaction processing systems are used for critical business tasks in a number of industries. A transaction defines a single unit of work that must either be fully completed or fully purged without action. For example, in the case of a bank automated teller machine from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, a transaction affects resources managed at the local automated teller device as well as bank balances managed by a bank's main computer. Such transactions involve one particular client computer (e.g, 10) communicating with one particular server computer (e.g., 20) over a series of client requests which are processed by the server. The OMG's OTS is responsible for coordinating these distributed transactions.

Usually, an application running on a client process begins a transaction which may involve calling a plurality of different servers, each of which will initiate a server process to make changes to its local database according to the instructions contained in the transaction. The transaction finishes by either committing the transaction (and thus all servers finalize the changes to their local databases) or aborting the transaction (and thus all servers "rollback" or ignore the changes to their local databases). To communicate with the servers during the transaction (e.g., instructing them to either commit or abort their part in the transaction) one of the processes involved must maintain state data for the transaction. This usually involves the process to set up a series of transaction state objects, one of which is a Coordinator object which coordinates the transaction with respect to the various servers.

A conventional implementation of the OTS, which was developed by the International Business Machines Corporation and included in its Component Broker Series (a trademark of the IBM Corp.) product announced in May of 1997, is shown in FIG. 2. A client process 21 which wants to begin a transaction (e.g., to withdraw money from a bank account) needs to locate a process which is capable of creating and holding the transaction objects that will maintain the state of the transaction. As the modern tendency is to create clients that are "thin" (and thus have only the minimum functionality), the client process 21 will usually not be able to maintain the transaction objects locally and must look for a server process for this purpose.

According to this prior art approach, the OTS (or another service, such as the CORBA Lifecycle service) locates a server process on which to create the transaction state objects (which include the Coordinator object 223, Control object 221 and Terminator object 222). The same server process (server A process 22 in FIG. 2) is always chosen according to this prior art. Upon locating the server A process 22, client process 21 sends (arrow with encircled number 1) a message to server A process 22 to instruct server A process 22 to create the transaction state objects. The Control object 221 (known in the OTS as CosTransactions::Control) provides access to the other two transaction state objects. The Terminator object 222 (known in the OTS as CosTransactions::Terminator) is used to end the transaction. The Coordinator object 223 (known in the OTS as CosTransactions::Coordinator) maintains a list, in local storage 225, of resource objects (such as bank account objects 224, 231) (known in the OTS as CosTransactions::Resource) that have made updates to their respective data during the transaction. This list is required so that the Coordinator object 223 can consistently call them at the end of the transaction to commit their transactional changes (make their local data changes final) or rollback such changes (bring the local data back to the state it was in before the transaction started). A rollback would be necessary, for example, where the transaction could not finish properly because one of the resources was not working properly.

Server A process 22 then creates the transaction state objects (221, 222, 223) and sends a reply (arrow with encircled number 2) containing the transaction context to client 21. Client 21 then sends a debit bank account command (arrow with encircled number 3) to server B process 23 (the process containing the bank account object 231 which the client process 21 wishes to withdraw money from). This latter command carries with it the transaction context supplied to the client 21 by the server A process 22. In this way, the bank account object 231 in process 23 can register itself (arrow with encircled number 4) with the coordinator object 223 in process 22 so that the bank account object 231 can be commanded (arrow with encircled number 5) to commit or rollback by the coordinator object 223 at the end of the transaction.

In the above operation, when the coordinator object 223 is created along with the other transaction state objects 221 and 222, the coordinator object 223 must log information about itself and the transaction it represents in local storage 225, so that the transaction will be recoverable in case of a failure which temporarily prevents the server A process 22 from continuing with the transaction.

There are many transactions which start and finish within the same server process (server A process 22), and which do not involve the need for a resource to update its local data. For these types of transactions, it is a server process that actually begins the transaction (rather than the client process as discussed above). For example, a client process 21 operating within an automated teller machine (ATM) is executing on behalf of a bank account holder who merely wishes to obtain the balance of his bank account (which is represented in FIG. 2 by Bank Account object 224). The client process 21 sends a balance enquiry command to a server process 22 which contains the bank account object 224 which the client wishes to check the balance of. Accordingly, the server process 22 would then begin the transaction by creating the three transaction state objects 221, 222 and 223. The Coordinator object 223 access local storage 225 in order to log-in the transaction to make it recoverable. The transaction proceeds to access the Bank Account object 224, read its balance and return it to the client process 21. The transaction then ends by using the Terminator object 222 to destroy the other transaction state objects 221 and 223 and then the Terminator object 222 destroys itself.

In these latter types of transactions, the prior art implementation is inefficient. Since no additional server processes had to be called and no local resources have made updates to local data throughout the whole transaction, the Coordinator's functions of logging the transaction to storage 225 has been unnecessary. Further, the very fact that the Coordinator had to be instantiated has taken up some processing power which could be better spent elsewhere in the server process 22.

SUMMARY OF THE INVENTION

According to a first aspect, the present invention provides a server processing apparatus for use in a client/server computing system which carries out transactions, the apparatus having: a means for receiving a command instructing the server processing apparatus to carry out a step of a transaction; a means for beginning the transaction; and a means for determining whether a predetermined triggering event has occurred during the carrying out of the transaction, and only if the triggering event has occurred, creating a means for coordinating the transaction with respect to a plurality of elements that are involved in carrying out the transaction.

Preferably, the triggering event is the receipt of a request to update a local resource as part of the transaction. Further preferably, the triggering event is the receipt of a request to invoke an additional server processing apparatus as part of the transaction.

In the preferred embodiment, the means for coordinating is a Coordinator object, as defined by the Common Object Request Broker Architecture's Object Transaction Service (CORBA's OTS), and the elements that are involved in carrying out the transaction are local resources or a remote server process. Preferably, the means for coordinating involves commanding each the transactionally involved local resources and/or remote server processes to commit their respective transactional activity.

According to a second aspect, the invention provides a method of carrying out the functionality of the server described above in the first aspect.

According to a third aspect, the invention provides a computer program product stored on a computer readable storage medium for, when run on a computer, carrying out the functionality of the first aspect.

Thus, with the present invention, a highly efficient use of server processor cycles is used as the Coordinator object is not instantiated until a triggering event occurs which requires the use of the Coordinator object. Thus, if a transaction does not produce such a triggering event, the Coordinator object will not be instantiated, thus saving on the server's processor cycles. Also, if the Coordinator object is not instantiated, this saves on writes to local storage that would otherwise occur when the Coordinator object logs the existence of the transaction for recovery purposes when the Coordinator object is first instantiated.

BRIEF DESCRIPTION OF THE DRAWINGS

The invention will be better understood by the below description of preferred embodiments thereof to be read while referring to the following figures.

DETAILED DESCRIPTION OF THE PREFERRED EMBODIMENTS

A preferred embodiment of the present invention will now be described with reference to FIG. 3 (block diagram) and FIG. 4 (functional flowchart). In an illustrative example that will be used, it will be assumed that the transaction being carried out is a balance enquiry of a bank account, a common transactional operation that is frequently carried out on a daily basis, worldwide, using an Automated Teller Machine (ATM) as the client.

The Common Object Request Broker (CORBA) Object Transaction Service (OTS) supplies an interface object known as "Current" which has a "begin" method used by application programs (source code) running in a process to begin a transaction. When the application is being built or executed on a particular architecture and contains the "begin" method, the underlying OTS software will proceed (as described above with respect to the prior art) to create the transaction by setting up the transaction state objects in a server process.

It should be noted that in the prior art, once a command instructing the server to carry out a step of a transaction (e.g. check balance of bank account) is sent to a remote server process 22, the server process 22 calls the "begin" method on the "Current" interface, which results in the three transaction state objects (221, 222 and 223) being instantiated in that server process 22. The present invention alters this prior art by creating only the Control and Terminator objects (221 and 222) at this early stage (see FIG. 3). The Coordinator object 223 will be created at a later stage in the transaction if a predetermined triggering event has occurred, as will now be described.

Figure 3:
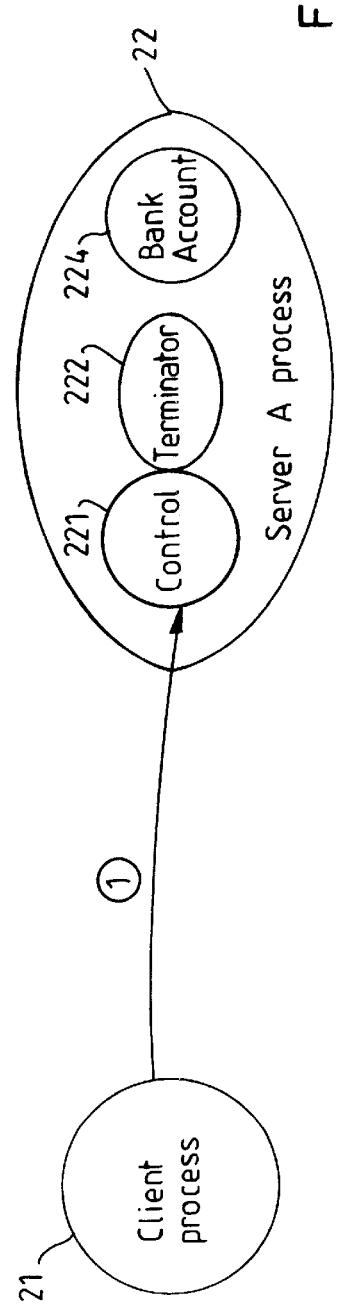
FIG. 3 is a block diagram showing an OTS implementation according to a preferred embodiment of the present invention.
Figure 4:
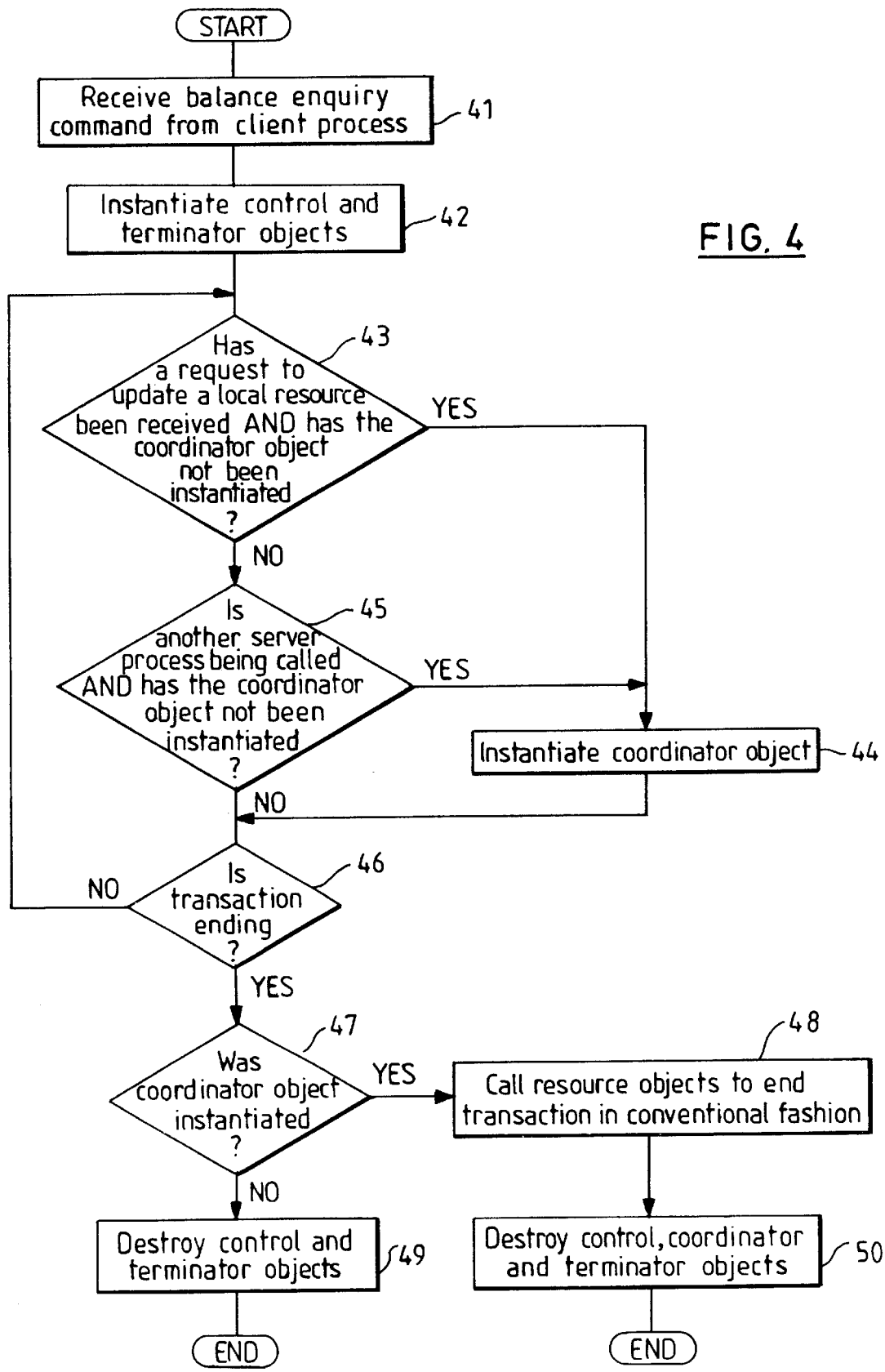
FIG. 4 is a flowchart showing the steps which take place within a server process when a client issues a begin transaction command according to the OTS implementation of FIG. 3.

At step 41 (see FIG. 4) the server process 22 receives the balance enquiry command from the client process 21 (see arrow with encircled number 1 in FIG. 3). At step 42 the server process 22 creates the transaction state objects by instantiating the Control and Terminator objects 221 and 222. It should be clearly noted that the Coordinator object 223 is not created at this point.

The transaction then proceeds as normal under the control of the application running in the server process 22. During the transaction, the server process proceeds to step 43 where it determines whether both of two conditions have occurred:

1) Has a request to update a local resource been received?

A local resource (e.g., Bank Account object 224) is an object that is located in the same server process (22) as the Control and Terminator objects (221, 222). An update to such a resource occurs when the transaction has resulted in a value of the local resource being altered. For example, if the transaction has commanded a withdrawal of funds from the bank account represented by local resource Bank Account object 224, this would involve the Bank Account object 224 reducing (e.g., altering) the value of the balance of funds available, and this is an update to the value of the balance.

2) Has the Coordinator object not been instantiated yet?

As will be seen below, step 43 may be executed repeatedly and it is possible that on a prior run through the later steps the Coordinator object has been instantiated. This condition simply determines whether the Coordinator object has still not been created.

Thus, at step 43, if the transaction has requested that a local resource (such as the Bank Account object 224) be updated AND if the Coordinator object 223 has not yet been instantiated, control flows to step 44 where the Coordinator object 223 is instantiated. That is, a triggering event has occurred which requires that the Coordinator object 223 be called into the transaction (a local resource has been requested to be updated). Before this point in the transaction, there was no need for the Coordinator object 223 and thus the present invention does not create this object 223 until it is needed in the transaction.

However, if either or both of the two conditions has not occurred, control flows to step 45 where the server process 22 determines whether both of two conditions have occurred:

1) Has a request to involve an additional server process been received?

Figure 1:
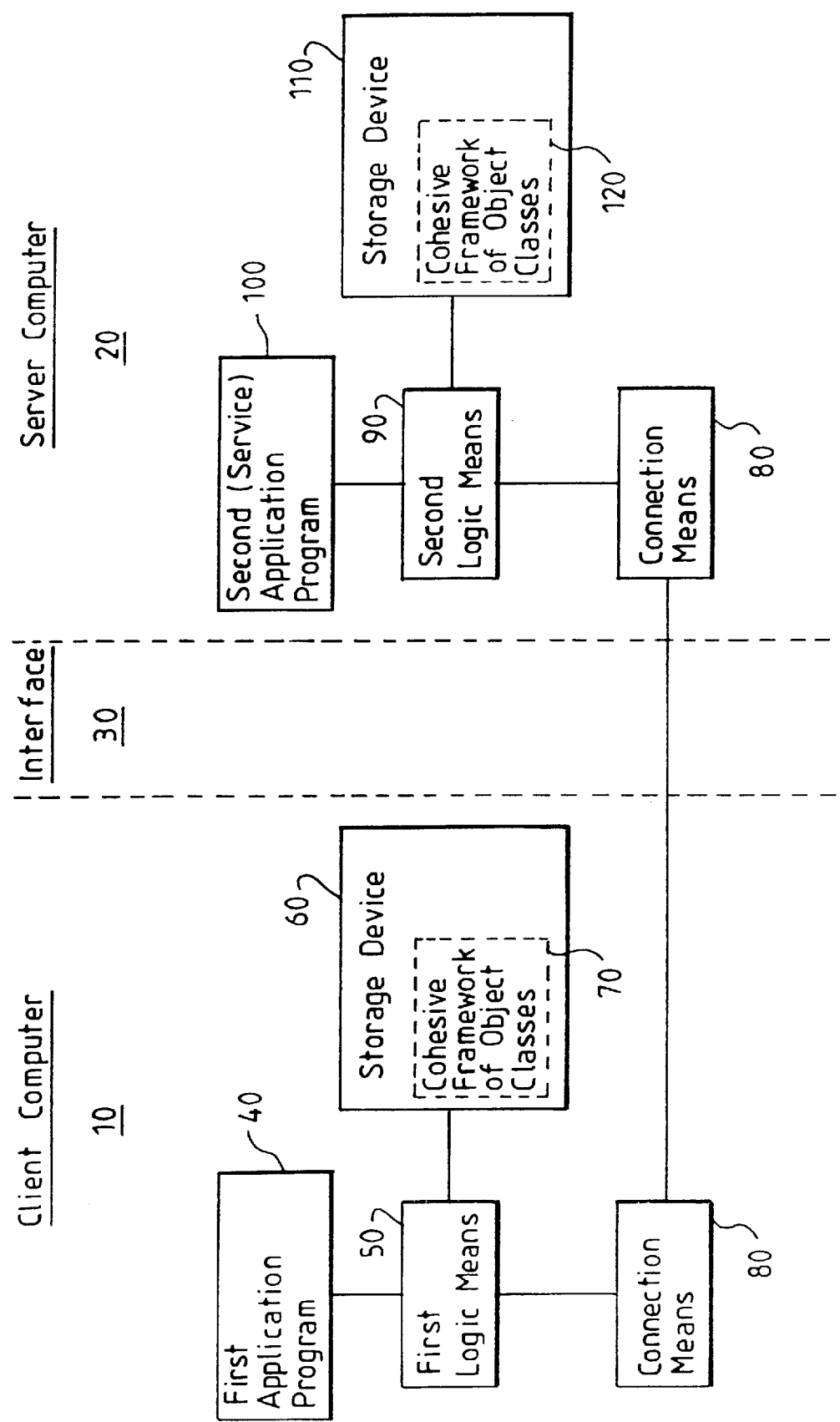
FIG. 1 is a block diagram of a well-known heterogeneous client/server architecture using object technology, in the context of which preferred embodiments of the present invention can be applied.
Figure 2:
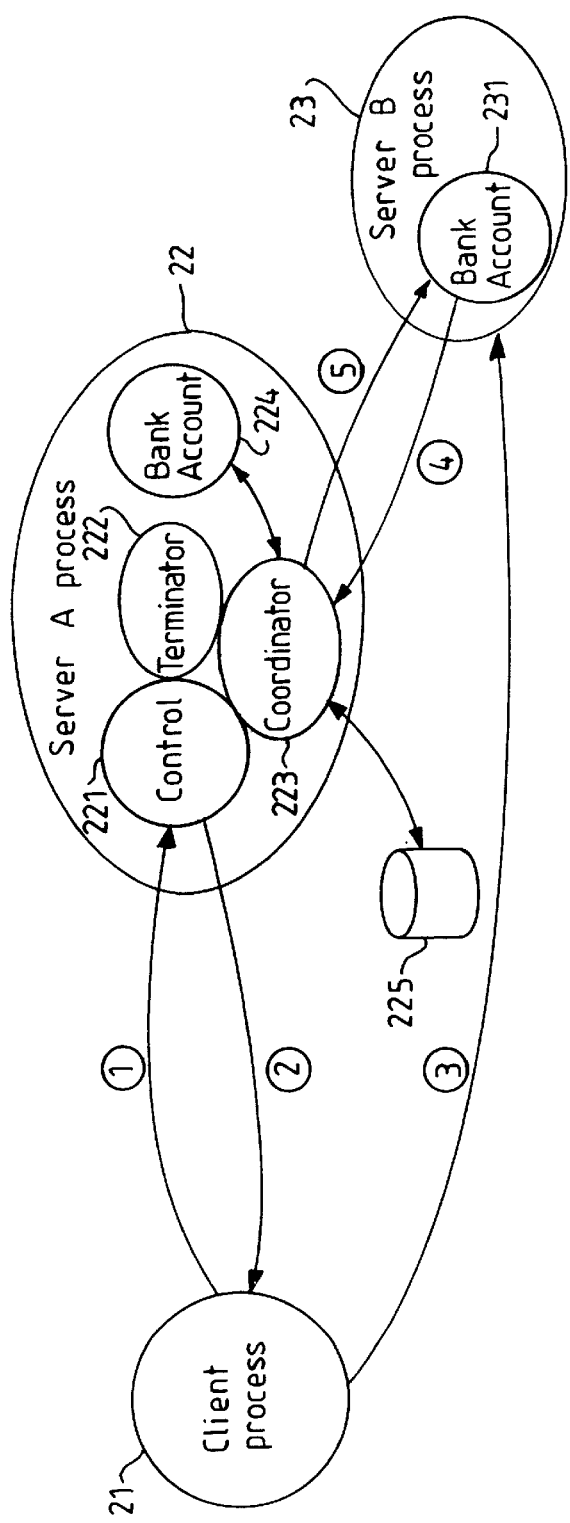
FIG. 2 is a block diagram showing a conventional OTS implementation.

Oftentimes, as part of the application instructing the transaction, the server process 22 which holds the transaction objects is instructed to invoke another server process (e.g., server B process 23 in FIG. 2). This is usually when the transaction seeks to access the resources of that additional server process (e.g., Bank Account object 231). For example, perhaps a transaction requires that the balances of two separate bank account objects be compared. This first condition of step 45 determines whether the server process 22 has received a request to invoke another server process in the transaction.

2) Has the Coordinator object not been instantiated yet?

Again, it is possible that on a prior run through the flowchart steps the Coordinator object has been instantiated (at step 44). This condition simply determines whether the Coordinator object has still not been created.

Thus, at step 45, if the transaction has requested that an additional server process (such as server process 23) be invoked AND if the Coordinator object 223 has not yet been instantiated, control flows to step 44 where the Coordinator object 223 is instantiated. That is, a triggering event has occurred which requires that the Coordinator object 223 be called into the transaction (an additional server process has been requested to be invoked). Before this point in the transaction, there was no need for the Coordinator object 223 and thus the present invention does not create this object 223 until it is needed in the transaction.

However, if either or both of the two conditions for step 45 has not occurred, control flows to step 46 where the server process 22 determines whether the transaction has requested that the transaction be completed. If not, control flows back to step 43 where the steps 43 through 46 are repeated, and specific branches (YES or NO) are taken depending on the present state of the transaction.

If, at step 46, the transaction is to be ended, control flows to step 47 where the server process 22 determines whether the Coordinator object 223 was ever instantiated (that is, whether step 44 was ever carried out). If it was not (such as would be the case if the client ATM was seeking only to check the balance of a bank account represent by a Bank Account object 224 that is local to the server process 22), control flows to step 49 where the Terminator object 222 destroys the Control object 221 and then destroys itself.

However, if the Coordinator object 223 was instantiated during this transaction, then the Coordinator object 223 uses the information it has logged in storage 225 to conduct a coordinated shut-down of the transaction in a well known fashion (step 48). That is, the Coordinator object 223 calls each local resource (e.g., 224) that has updated its data and calls each remote server process (e.g., 23) which has been invoked during the transaction (which results in this remote process 23 passing on the call to its local resource 231), in order to instruct the resources to either commit or rollback their respective changes. The Terminator object 222 then destroys the Control object 221 and the Coordinator object 223, and then destroys itself (step 50) all in a conventional fashion as known in the prior art.

Below is an outline of the programming changes required to IBM's Component Broker product (the admitted prior art discussed above) to implement this invention.

1) When a transaction is started, a CosTransactions::Control object is made available to the application, usually via the CosTransactions::Current object. If the request to start the transaction was issued in a server, only the CosTransactions::Control object (221) and CosTransactions::Terminator object (222) are created.

2) When recoverable resources are updated, the application must register a CosTransactions::Resource object (e.g., 224) with the CosTransactions::Coordinator object (223) for the transaction. To get hold of the CosTransactions::Coordinator object (223), it must call the method CosTransactions::Control::get_coordinator( ). If the CosTransactions::Coordinator object (223) has not yet been created, it is created during the CosTransactions::Control::get_coordinator( ) method.

3) When a request is about to be flowed to another server, the OTS interceptors are called. They use the CosTransactions::Current interface to access the CosTransactions::Control object (221). They then call the method CosTransactions::Control::get_coordinator( ) to access the CosTransactions::Coordinator object (223) in order to get the CosTransactions::PropagationContext to send with the request. Again, if the CosTransactions::Coordinator object (223) does not exist, it is created in the CosTransactions::Control::get_coordinator( ) method.

4) When the CosTransactions::Terminator object (222) is called to end the transaction, it looks to see if the CosTransactions::Coordinator object (223) has been created. If it has, then the CosTransactions::Coordinator object (223) is called and the transaction is ended in the normal way (steps 48 and 50). If no CosTransactions::Coordinator object (223) exists it simply destroys itself and the CosTransactions::Control object and returns (step 49).

By breaking away from the confines of the conventional technique of treating all transactions the same, the present invention provides for a great savings in processor cycles at the server. The coordinated transaction shutdown mechanism (the Coordinator object 223 in the preferred embodiment) is not set up until this mechanism is necessary in the context of the transaction begin presently executed. This also prevents the transaction from having to be logged to storage when such logging is unnecessary for the presently executing transaction.

We claim:

1. A server processing apparatus for use in a client/server computing system which carries out transactions, said apparatus comprising:

means for receiving a command instructing the server processing apparatus to carry out a step of a transaction;

means for beginning the transaction; and means for determining whether a predetermined triggering event has occurred during the carrying out of the transaction, and only if the triggering event has occurred, creating a means for coordinating the transaction with respect to a plurality of elements that are involved in carrying out the transaction.

2. The apparatus of claim 1 wherein said triggering event is the receipt of a request to update a local resource as part of the transaction.

3. The apparatus of claim 1 wherein said triggering event is the receipt of a request to invoke an additional server processing apparatus as part of the transaction.

4. The apparatus of claim 1 wherein said means for coordinating is a Coordinator object, as defined by the Common Object Request Broker Architecture's Object Transaction Service (CORBA's OTS).

5. The apparatus of claim 1 wherein said elements that are involved in carrying out the transaction are local resources or a remote server process.

6. The apparatus of claim 5 wherein said coordinating involves commanding each the transactionally involved local resources and/or remote server processes to commit their respective transactional activity.

7. A server processing method for use in a client/server computing system which carries out transactions, said method, which is carried out on a server, comprising steps of:
   receiving a command instructing the server to carry out a step of a transaction;
   beginning the transaction; and
   determining whether a predetermined triggering event has occurred during the carrying out of the transaction, and only if the triggering event has occurred, creating a means for coordinating the transaction with respect to a plurality of elements that are involved in carrying out the transaction.

8. The method of claim 7 wherein said triggering event is the receipt of a request to update a local resource as part of the transaction.

9. The method of claim 7 wherein said triggering event is the receipt of a request to invoke an additional server processing apparatus as part of the transaction.

10. The method of claim 7 wherein said means for coordinating is a Coordinator object, as defined by the Common Object Request Broker Architecture's Object Transaction Service (CORBA's OTS).

11. The method of claim 7 wherein said elements that are involved in carrying out the transaction are local resources or a remote server process.

12. The method of claim 11 wherein said coordinating involves commanding each the transactionally involved local resources and/or remote server processes to commit their respective transactional activity.

13. A computer program product stored on a computer readable storage medium for, when run on a server computer, carrying out a server processing method for use in a client/server computing system which carries out transactions, said method comprising steps of:
   receiving a command instructing the server computer to carry out a step of a transaction;
   beginning the transaction; and
   determining whether a predetermined triggering event has occurred during the carrying out of the transaction, and only if the triggering event has occurred, creating a means for coordinating the transaction with respect to a plurality of elements that are involved in carrying out the transaction.

14. The computer program product of claim 13 wherein said triggering event is the receipt of a request to update a local resource as part of the transaction.

15. The computer program product of claim 13 wherein said triggering event is the receipt of a request to invoke an additional server processing apparatus as part of the transaction.

16. The computer program product of claim 13 wherein the means for coordinating is a Coordinator object, as defined by the Common Object Request Broker Architecture's Object Transaction Service (CORBA's OTS).

17. The computer program product of claim 13 wherein said elements that are involved in carrying out the transaction are local resources or a remote server process.

18. The computer program product of claim 17 wherein said coordinating involves commanding each of the transactionally involved local resources and/or remote server processes to commit their respective transactional activity.

19. The apparatus of claim 1 wherein the command instructing the server processing apparatus to carry out a step of a transaction is received from a first client apparatus and the triggering event originates from a later request received from the first client apparatus.

20. The method of claim 7 wherein the command instructing the server to carry out a step of a transaction is received from a first client and the triggering event originates from a later request received from the first client.

21. The computer program product of claim 13 wherein the command instructing the server to carry out a step of a transaction is received from a first client and the triggering event originates from a later request received from the first client.

* * * * *